United States Patent [19]

Casey

[11] Patent Number: 4,579,470

[45] Date of Patent: Apr. 1, 1986

[54] KEYBOARD WITH KEYS CONCENTRATED IN CLUSTERS

[76] Inventor: Cullen Casey, 49 Congress St., Apt. #29, Nashua, N.H. 03062

[21] Appl. No.: 599,056

[22] Filed: Apr. 11, 1984

[51] Int. Cl.⁴ .............................................. B41J 5/10
[52] U.S. Cl. .................................. 400/489; 400/486; 400/491.3
[58] Field of Search ............... 400/472, 486, 487, 488, 400/489, 491.3

[56] References Cited

U.S. PATENT DOCUMENTS

| | | | |
|---|---|---|---|
| 366,166 | 7/1887 | Healy | 400/489 |
| 556,422 | 3/1896 | Von Kunowski | 400/489 |
| 848,471 | 3/1907 | Laudenbach | 400/487 X |
| 1,138,474 | 5/1915 | Heidner | 400/489 |
| 1,200,439 | 10/1916 | Kemble | 400/489 |
| 1,342,244 | 6/1920 | Wolcott | 400/486 |
| 1,652,464 | 12/1927 | Tyberg | 400/489 |
| 1,678,334 | 7/1928 | Fischer | 400/489 |
| 2,040,248 | 5/1936 | Dvorak et al. | 400/486 |
| 3,929,216 | 12/1975 | Einbinder | 400/489 X |
| 3,945,482 | 3/1976 | Einbinder | 400/489 X |
| 4,244,659 | 1/1981 | Malt | 400/488 X |
| 4,332,493 | 6/1982 | Einbinder | 400/489 X |

FOREIGN PATENT DOCUMENTS 1016993  1/1966  United Kingdom ............... 400/489

OTHER PUBLICATIONS

IBM Technical Disclosure Bulletin, "Input Keyboard", Stukert, vol. 14, No. 3, Aug. 1971, pp. 952–959.

Primary Examiner—Ernest T. Wright, Jr.
Attorney, Agent, or Firm—John P. McGonagle

[57] ABSTRACT

A typewriter keyboard arrangement with keys concentrated in clusters in such a manner so as to be operated by specific fingers designated for specific clusters. Keys are clustered and clusters arranged to allow rapid finger motion with little hand motion. The keyboard arrangement also allows the hands and arms to be positioned in a natural manner in relation to the body.

16 Claims, 3 Drawing Figures

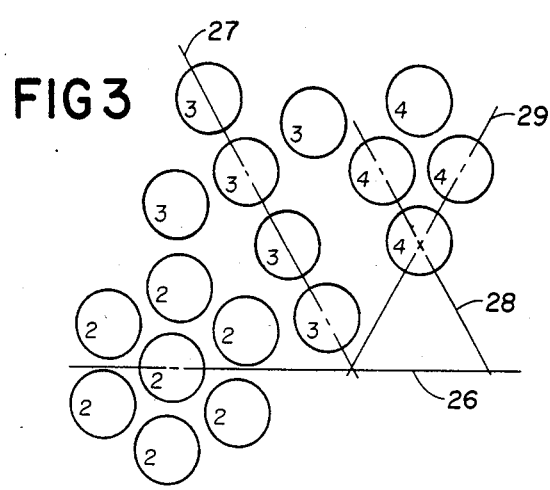

KEYBOARD WITH KEYS CONCENTRATED IN CLUSTERS

BACKGROUND OF THE INVENTION

This invention relates to keyboards and in particular to an improved input keyboard for use with an electric or electronic typewriter, word processor or computer input terminal.

At present, typewriters, word processors and computer input keyboards use a standard system of keys arranged on parallel stepped rows. The format is known as the Qwerty system. The name is derived from the first six letters reading from left to right of the top row of the standard typewriter keyboard.

The typewriter, as invented in 1872 by Christopher Sholes, had a serious flaw. His invention had a logical sequencing of key locations that coincided with the more frequently used letters. But, whenever typists worked up speed, the more frequently used letters mechanically jammed. Typewriting machines as built then could not accomodate the high input speeds of the more proficient operators. To remedy the problem, Sholes rearranged the keyboard, positioning frequently used letter combinations as far from each other as possible and assigning a disproportionate amount of work to the weakest fingers. By relocating and changing the juxtaposition of several important often used letter keys so that the were not so readily accessible to the center of the keyboard and the stronger, more agile index and middle fingers, typists were substantially slowed. This largely eliminated the jammed-key problem and thus was born the modern "QWERTYUIOP" keyboard.

The prior art includes various patents which attempt to take advantage of improvements in electro-mechanical design and manufacture by rearranging keyboards to increase typing speeds. Inventors have proposed splitting the keyboard into groups with curved key rows to fit the hand. They have suggested keys of variable height to compensate for differences in finger length, and have advocated moving shift and control keys to the center of the keyboard to be operated by the thumb or fourth finger. Inventors have also tried to simplify stroking motions by setting common letters on home keys directly under the fingers, so a majority of strokes lie on the middle row, rather than the top letter row. They have distributed other letters so the number of strokes allocated to individual fingers varies according to strength. These innovations have not succeeded on the standard keyboard because its arrangement of letters leads to complex stroking patterns that mask any improvements due to geometric changes.

Included in the prior art are: U.S. Pat. No. 556,422 to A. Von Kunowski which relates to typewriter keyboards having keys arranged in two symmetrically placed groups arranged in curves corresponding to the guiding-lines of the four fingers and the thumbs; U.S. Pat. No. 1,138,474 to F. Heidner which relates to typewriter keyboards having two groups of keys separated from each other by a space of such width that the forearms of the operator lie substantially parallel with each other, the transverse rows of keys of each group running in the form of curves whose concavity is on the side next the operator; U.S. Pat. No. 1,200,439 to W. F. Kemble which relates to keyboards with keys divided into groups corresponding to the natural directions of movement of fingers of the hand; U.S. Pat. No. 1,652,464 to O. Tyberg which relates to a printing keyboard divided into distinct groups relating to each hand; U.S. Pat. No. 1,678,334 to O. Fischer which relates to typewriting keyboards divided into three groups with keys of variable height corresponding to the natural positions of the finger tips of an operator; and U.S. Pat. No. 2,040,248 to Dvorak, et al, which relates to keyboards having common letters or home keys directly under the fingers so a majority of strokes lie on the middle row, rather than the top letter row of the standard keyboard.

U.S. Pat. Nos. 3,929,216 and 3,945,482 to H. Einbinder disclose alternative designs of keyboards in which the letters and numbers are arranged in a different manner than the standard Qwerty keyboard. These patents disclose keys for the right and left hand which are separated from each other so that the typist can have the forearms extending parallel to each other with the fingers resting at their normal positions on the keys rather than inclined towards each other as with the standard keyboard. These patents also disclose keyboards with keys for depression by the thumbs for operating letters as well as the functional keys such as the space bar on the conventional keyboard. Special code keys are arranged between the spaced sets of keys for the two hands.

U.S. Pat. No. 4,244,659 to L. G. Malt relates to a typewriter keyboard divided into four groups. Two groups of keys are provided for operation by the fingers of the left and right hands, respectively, and two additional groups of keys are provided for operation by the right and left thumbs, respectively. Each of the four groups of keys is arranged on a surface which is concave in two orthogonal directions.

The present invention is directed to solving the aforementioned problems by providing a keyboard with a logical and expeditious arrangement of keys arranged in such a manner as to increase ease of operation and rate of data input.

Accordingly, an object of this invention is to provide an improved keyboard arrangement allowing the hands and arms to be positioned in a natural manner in relation to the body.

Another object of this invention is to provide an improved keyboard arrangement allowing rapid finger motion with little hand motion.

Another object of this invention is to provide an improved keyboard arrangement with keys concentrated in clusters in such a manner so as to be easily operated by specific fingers designated for specific clusters.

BRIEF DESCRIPTION OF THE DRAWINGS

FIG. 3 is a top view showing that portion of the keyboard shown in FIG. 1 comprising the clusters of keys operated by the second, third and fourth fingers of the right hand with further dimensioning and numerical labeling of each cluster to denote which finger is to operate with each cluster of keys.

DETAILED DESCRIPTION OF THE INVENTION

Figure 1:
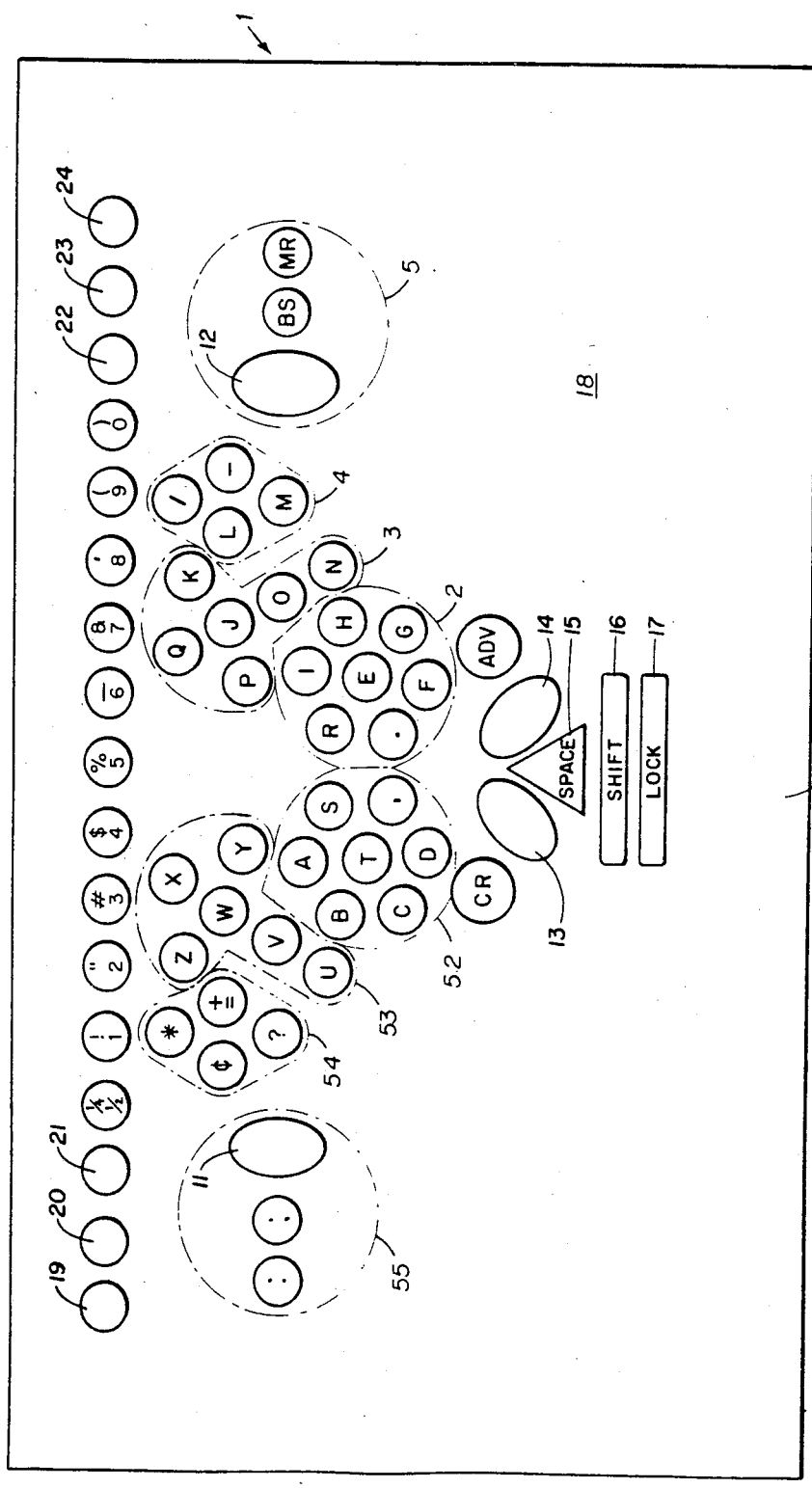
FIG. 1 is a top view of a keyboard according to the invention showing the locations of character keys, function keys and guide pads, clustered in certain positions relative to each other.

Referring more particularly to the drawings, reference numeral 1 refers generally to the keyboard comprising the present invention. FIG. 1 is a top view of the keyboard 1 as seen from above or from the operator's view. The keyboard 1 has a number of keys and pads clustered in certain positions relative to each other. The keys and pads can be of circular, elliptical, and/or triangular shape. They might also be of any other suitable geometric shape and approximately the same size such as rectangular or square, etc., as are those in common use in the industry and prior art. The keys may have flat top surfaces or be slightly concave or curved with printed or indented letters of the alphabet and punctuation marks on their top surfaces as are those in common use in the industry and prior art. The actual amount of downward movement of the keys, the mechanism for making the necessary contact to enable the character to be printed on a piece of paper or shown on a CRT word processor or computer screen, and the other attendant mechanisms and devices to hold, house and guide the key and return it to its proper position after activation are as those in common use in the industry and prior art. The arrangement of the top row of keys with the numerals 1, 2, 3, 4, 5, 6, 7, 8, 9, and 0 and their attendant punctuation marks in the upper case are as those in common use in the industry and prior art. The six additional keys in this row, three on the left 19, 20 and 21, and three on the right 22, 23, and 24, provide room for the addition of special command keys, especially for applications such as word processor and computer input terminals. The keyboard base 18 could be made from molded plastic or metal or a combination of the two materials and could be provided with extra length to the right or left of the center line of the keyboard 1 to accommodate numeric key pads, cursor controls, and special command and function keys, all of which are common appurtenances which often are included on keyboards at present.

The keyboard arrangement shown in FIG. 1 is symmetrical in relation to key location and key size on either side of the center line running from the key for numeral 5 through the triangular SPACE key 15.

The key clusters and guide pads 11, 12, 13 and 14 could each be of a different color or shade of color to better differentiate to the keyboard operator which key clusters should be operated by which finger. In whatever color code scheme used the keys and guide pads for right and left hands would be coded in the same manner.

The keys are arranged generally so that operation of the keyboard 1 is most facilitated by the keyboard operator holding his or her arms at a 45 degree angle from his or her body. The home row in this embodiment would begin with the 5th Finger Left Hand Guide Pad 11, through keys "?", V, T, to Thumb Left Hand Guide Pad 13, to Thumb Right Hand Guide Pad 14, through E, O, M to the 5th Finger Right Hand Guide Pad 12. The operator positions the hands by using the guide pads 11, 12, 13, and 14. The little finger left hand is place on the 5th Finger Left Hand Guide Pad 11 and the left hand thumb is placed on the Thumb Left Hand Guide Pad 13. The little finger right hand is place on the 5th Finger Right Hand Guide Pad 12 and the right hand thumb is placed on the Thumb Right Hand Guide Pad 14. With the hands thus positioned over the keyboard 1, the remaining fingers are positioned over clusters of keys.

With the left hand positioned by the guide pads 11 and 13, the left index finger would operate the seven key cluster 52 centered by the home row key T. The left index key cluster 52 consists of A, B, C, D, Comma, S, and T. The left middle finger would operate the six key cluster 53: U, V, W, X, Y, and Z. V is the left middle finger home row key. The left fourth finger operates the four key cluster 54:*, +, ¢, ?. The "?" is the left fourth finger home row key. The fifth finger left hand in addition to holding the left hand in operating position by means of the fifth finger left hand guide pan 11 operates the Colon and Semicolon keys. The fifth finger left hand cluster 55 consists therefore of the Colon and Semi-colon keys and the fifth finger left hand guide pads 11 with the latter being the fifth finger left hand home key. The left thumb, in addition to holding the left hand in operating position by means of the thumb left hand guide pad 13, operates the Carriage Return CR and shares operation of the SPACE, SHIFT and LOCK control keys 15, 16, and 17 respectively with the right thumb. The thumb left hand guide pad 13 is the left thumb home key.

The right hand is positioned by the guide pads 12 and 14. The right index finger operates the seven key cluster 2 centered by the home row key E. The right index key cluster 2 consists of E, F, G, H, I, R and ".". The right middle finger would operate the six key cluster 3: J, K, N, O, P, Q. The right middle finger home row key would be O. The right fourth finger operates the four key cluster 4: L, M, /, and - . The M is the right fourth finger home row key. The fifth finger right hand in addition to holding the right hand in operating position by means of the fifth finger right hand guide pad 12 operates the Back-Space BS and Margin Release MR keys. The fifth finger right hand cluster 5 consists therefore of the Back-Space BS and Margin-Release MR keys and the fifth finger right hand guide pad 12 with the latter being the fifth finger right hand home key. The right thumb, in addition to holding the right hand in operating position by means of the thumb right hand guide pad 14, operates the Advance Key ADV and shares operation of the SPACE SHIFT and LOCK control keys 15, 16, and 17 respectively with the left thumb. The thumb right hand guide pad 14 is the right thumb home key.

Home row keys could be given a different surface treatment from the surrounding keys to better enable the fingers to orient themselves. The surface treatment may be one of several well known methods altering a surface to create a rough or bumpy texture, i.e., Knurling, Cross-Hatching, or Pebbly Surfacing. These may be added after the key is manufactured or included in the fabrication or casting process in the manufacture of the key.

FIG. 3 is a top view of the right side keys operated by the right index, middle and fourth fingers with numerical labeling of each cluster of keys. The "2" Keys correspond to the E, F, G, H, I, R and Period Keys in cluster 2 of FIG. 1 and are operated by the index or second finger. The "3" Keys in cluster 3 correspond to the J, K, N, O, P and Q keys of FIG. 1 and are operated by the middle or third finger. The "4" Keys correspond to the L, M, /, and - keys in cluster 4 of FIG. 1 and are operated by the fourth finger. In this embodiment of the invention all the "2" keys are 0.588 inches center to center. The "2" keys corresponding to the R, H, Period and G keys are at 60° to the line shown generally at 26. The "3" keys corresponding to Q, J, O and N are 9/16 inches apart center to center. These keys follow a line shown generally at 27. This line forms a 60° angle with the line 26 The "3" keys corresponding to P and K are each 9/16 inches center to center from the "3" key corresponding to J. The "4" key corresponding to L is 9/16 inches from the "4" keys corresponding to "/" and M. The "4" key corresponding to "-" is also 9/16 inches from the "4" key corresponding to "/" and M. The line generally described at 28 is parallel to the line 27. The line generally described by 29 is 60° from the line 28. The left side key arrangement of clusters 52, 53, and 54 (see FIG. 1) operated by the left hand would mirror this distancing and juxtapositioning. With hands thus positioned, the index finger of each hand is nearly perpendicular to the home row keys, T and E respectively. The middle fingers of each hand are positioned just above the home row keys, V and O respectively. The fourth fingers of each hand are positioned just above the home row keys, ? and M respectively.

Figure 2:
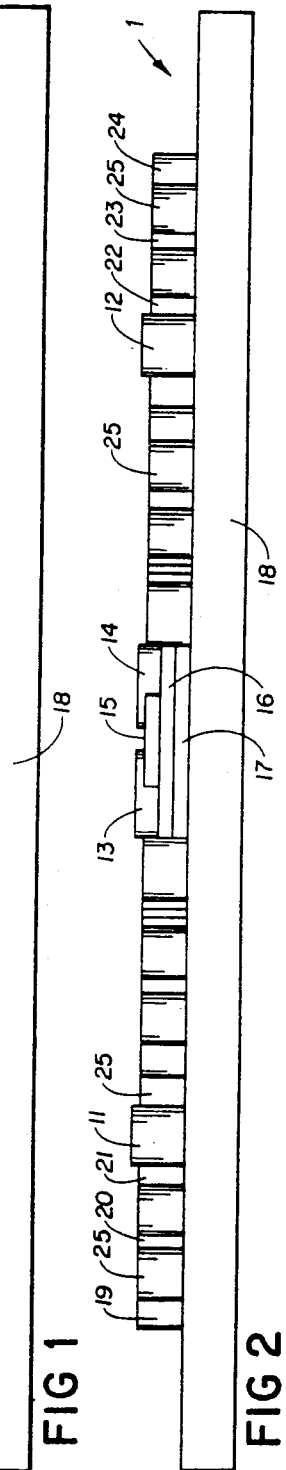
FIG. 2 is a front view of the keyboard shown in FIG. 1.

FIG. 2 is a front view of the keyboard 1 in this embodiment of the invention and illustrates the differences in planes of the various pads and keys. All alphanumeric keys 25 are in the same plane and are approximately ⅜ inches above the keyboard base 18. The thumb and fifth finger guide pads 11, 12, 13 and 14 are approximately 1/16 inches above the alphanumeric keys 25. The SPACE key 15 is in the alphanumeric key plane. The SHIFT key 16 is approximately ⅛ inch below the alphanumeric plane. The LOCK key 17 is approximately ¼ inch below the alphanumeric plane. If in other embodiments of this invention a lower alphanumeric plane is used, the same relative height differences between keys and pads should still be used.

The operation of the keyboard 1 is as follows. The keyboard 1 is placed on a desk or stand parallel to the front edge of the desk and at a distance great enough so that the underside of the operator's forearms down to and including the elbow are resting on the desk and are at a 45 degree angle to the edge of the desk and the operator's body. Each hand is positioned at the keyboard 1 so that the outside of each thumb is touching or just hovering slightly above the left and right thumb guides 13 and 14 respectively, and the fifth finger of each hand is resting on the left and right fifth finger guide pads 11 and 12 respectively. With hands thus positioned, the index finger of each hand is nearly perpendicular to the home row keys, T and E respectively. The middle finger of each hand is positioned just above the home row keys, V and O respectively. The fourth finger of each hand is positioned just above the home row keys, ? and M respectively.

With each hand thus positioned input to the keyboard 1 as shown in FIG. 1 may begin with each finger operating those keys or pads within its designated cluster. The left or right thumb may activate the SPACE, SHIFT or LOCK keys 15, 16, and 17 respectively. The left thumb operates the carriage return key CR and the right thumb operates the paper or line advance key ADV. The index finger of each hand operates its seven key circular cluster; the left 52: A, B, C, D, S, T, and Comma; the right 2: E, F, G, H, I, R, and Period. The middle finger of each hand operates its respective cross shaped cluster; the left 53: U, V, W, X, Y, and Z; the right 3: J, K, N, O, P, and Q. The fourth finger of each hand operates its respective diamond shaped cluster; the left 54: ?, +, ¢, and *: the right 4: L, M, /, and -. The fifth finger of each hand operates the two keys outboard of its respective guide pad, 11 or 12; the left: Colon and Semi-colon; the right BS and MR.

The clustered keys are so located that all can be operated by the fingers designated for them almost by finger motion alone with very little overall hand movement. The keys are lettered and clustered in such a manner as to present to the agile index finger the most frequently used letters, to the middle finger the next most frequently used letters, and to the fourth finger the next most frequently used letters.

It is understood that the above-described embodiment is merely illustrative of the application. Other embodiments may be readily devised by those skilled in the art which embody the principles of the invention and fall within the spirit and scope thereof. The exact arrangement, juxtaposition, distancing and labeling (key lettering) of the keys may be changed, without altering the basic concept of the keyboard 1.

I claim:

1. An input keyboard for the transfer of information to a machine by a human operator, comprising:
    a plurality of keys arranged in a plurality of hexagonal clusters for operation by the operator's left and right index fingers;
    a plurality of keys arranged in a plurality of cross-shaped clusters for operation by the operator's left and right middle fingers;
    a plurality of keys arranged in a plurality of diamond-shaped clusters for operation by the operator's left and right fourth fingers;
    a plurality of finger pads for placement of the operator's left and right fifth fingers;
    a plurality of keys arranged for operation by the operator's left and right fifth fingers;
    a plurality of thumb pads for placement of the operator's left and right thumbs;
    a plurality of keys arranged for operation by the operator's left and right thumbs; and
    a plurality of keys arranged in one row for operation by the fingers of both hands of the operator.

2. A keyboard as recited in claim 1 wherein the plurality of hexagonal clusters comprises:
    a left hexagonal cluster with seven keys, one key in the middle of the cluster and six forming a hexagonal shape around the middle key, arranged on the left hand side of the keyboard as viewed by the operator; and
    a right hexagonal cluster with seven keys, one key in the middle of the cluster and six forming a hexagonal shape around the middle key, arranged on the right hand side of the keyboard as viewed by the operator and in a mirror relationship with the left hexagonal cluster.

3. A keyboard as recited in claim 2 wherein the plurality of cross-shaped clusters comprises:
    a left cross-shaped cluster with six keys, four keys in a row top to bottom and two keys on either side of the second key from the top of the row, arranged on the left hand side of the keyboard approximately 45° above and to the left of the left hexagonal cluster as viewed by the operator; and
    a right cross-shaped cluster with six keys, four keys in a row top to bottom and two keys on either side of the second key from the top of the row, arranged on the right hand side of the keyboard approximately 45° above and to the right of the right hexagonal cluster as viewed by the operator and in a mirror relationship with the left cross-shaped cluster.

4. A keyboard as recited in claim 3 wherein the plurality of diamond-shaped clusters comprises:
a left diamond-shaped cluster with four keys arranged on the left hand side of the keyboard approximately 45° above and to the left of the left cross-shaped cluster as viewed by the operator; and
a right diamond-shaped cluster with four keys arranged on the right hand side of the keyboard approximately 45° above and to the right of the right cross-shaped cluster as viewed by the operator and in a mirror relationship with the left diamond-shaped cluster.

5. A keyboard as recited in claim 4 wherein the plurality of finger pads comprises:
a left finger pad for the operator's left fifth finger positioned to the left and slightly below the left diamond-shaped cluster as viewed by the operator; and
a right finger pad for the operator's right fifth finger positioned to the right and slightly below the right diamond-shaped cluster as viewed by the operator and in a mirror relationship with the left finger pad.

6. A keyboard as recited in claim 5 wherein the plurality of thumb pads comprises:
a left thumb pad for the operator's left thumb positioned below and slightly to the right of the left hexagonal cluster as viewed by the operator; and
a right thumb pad for the operator's right thumb positioned below and slightly to the left of the right hexagonal cluster as viewed by the operator and in a mirror relationship with the left thumb pad.

7. A keyboard as recited in claim 6 wherein the plurality of keys arranged for operation by the operator's left and right thumbs comprises;
a space key positioned between and slightly below the left and right thumb pads as viewed by the operator;
a shift key positioned immediately below the space key as viewed by the operator;
a lock key positioned immediately below the shift key as viewed by the operator;
a carriage return key positioned immediately to the left and slightly above the left thumb pad as viewed by the operator; and
a paper advance key positioned immediately to the right and slightly above the right thumb pad as viewed by the operator and in a mirror relationship with the carriage return key.

8. A keyboard as recited in claim 7 wherein the plurality of keys arranged for operation by the operator's left and right fifth fingers comprises:
a semicolon key positioned immediately to the left of the left finger pad as viewed by the operator;
a colon key positioned immediately to the left of the semicolon key as viewed by the operator;
a back space key positioned immediately to the right of the right finger pad as viewed by the operator and in a mirror relationship with the semicolon key; and
a margin release key positioned immediately to the right of the back space key as viewed by the operator and in a mirror relationship with the colon key.

9. A keyboard as recited in claim 8 wherein:
the row containing the plurality of keys for operation by the fingers of both hands of the operator is positioned above the key clusters across the top of the keyboard as viewed by the operator.

10. A keyboard as recited in claim 9 wherein the row containing the plurality of keys for operation by the fingers of both hands of the operator comprises:
a plurality of keys in order from the left as viewed by the operator to operate the numerals 1, 2, 3, 4, 5, 6, 7, 8, 9, and 0, and the fractions ¼ and ½, and the marks for exclamation point, quotation, pound sign, dollar sign, percentage, underline, and, single quotation, open parenthesis and closed parenthesis; and
a plurality of keys on the extreme left and extreme right of the row as viewed by the operator to operate as special command keys.

11. A keyboard as recited in claim 10 wherein:
the left hexagonal cluster keys operate the letters A, B, C, D, S and the Comma mark.

12. A keyboard as recited in claim 11 wherein:
the right hexagonal cluster keys operate the letters E, F, G, H, I, R and the Period mark.

13. A keyboard as recited in claim 12 wherein:
the left cross-shaped cluster keys operate the letters U, V, W, X, Y, and Z.

14. A keyboard as recited in claim 13 wherein:
the right cross-shaped cluster keys operate the letters N, O, J, Q, P, and K.

15. A keyboard as recited in claim 14 wherein:
the left diamond-shaped cluster keys operate the punctuation and sign marks for Asterisk, Question, Cent, Equals, and Plus.

16. A keyboard as recited in claim 15 wherein:
the right diamond-shaped cluster keys operate the letter and punctuation marks L, M, Slash and Hyphen.

* * * * *